Aug. 5, 1958   P. L. CLAUSING ET AL   2,845,884
SUBSURFACE SEED AND FERTILIZER PLANTER
Filed July 14, 1955   4 Sheets-Sheet 1
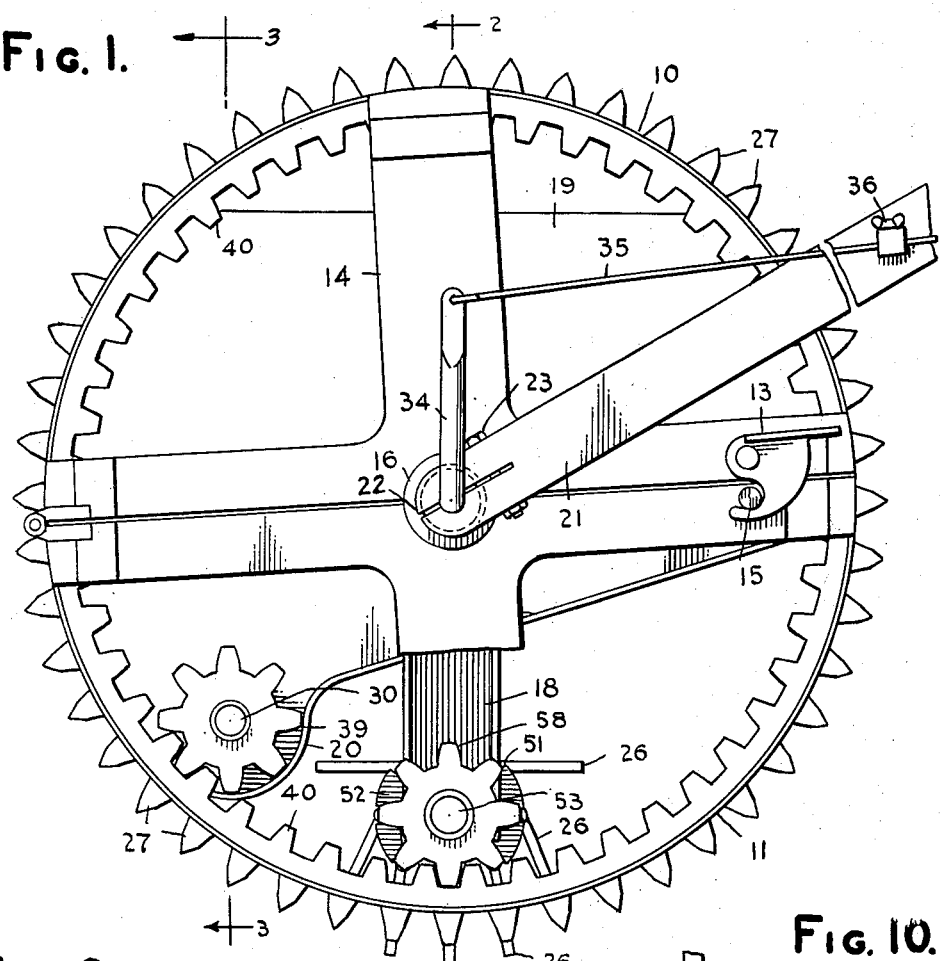
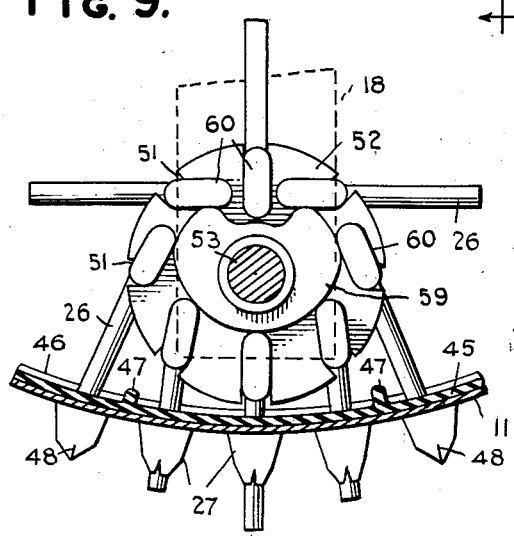
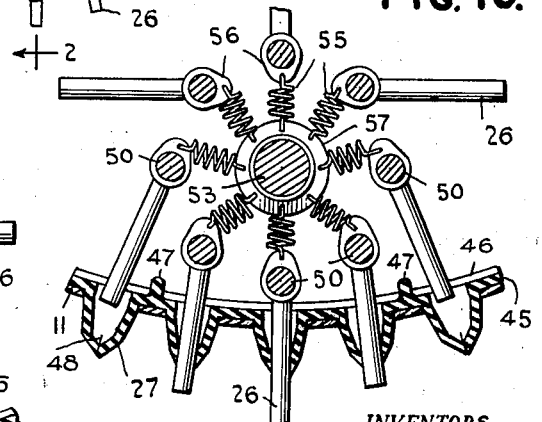
INVENTORS
PAUL L. CLAUSING
& DON P. CLAUSING
ATTORNEYS Aug. 5, 1958  P. L. CLAUSING ET AL  2,845,884
SUBSURFACE SEED AND FERTILIZER PLANTER
Filed July 14, 1955  4 Sheets-Sheet 2

INVENTORS
PAUL L. CLAUSING
& DON P. CLAUSING

By Holcombe, Wetterill & Brisebois
ATTORNEYS.

Aug. 5, 1958 P. L. CLAUSING ET AL 2,845,884
SUBSURFACE SEED AND FERTILIZER PLANTER
Filed July 14, 1955 4 Sheets-Sheet 3

INVENTORS
PAUL L. CLAUSING
& DON P. CLAUSING
By Holcombe, Wetherill & Brisebois
ATTORNEYS.

Aug. 5, 1958  P. L. CLAUSING ET AL  2,845,884
SUBSURFACE SEED AND FERTILIZER PLANTER
Filed July 14, 1955  4 Sheets-Sheet 4
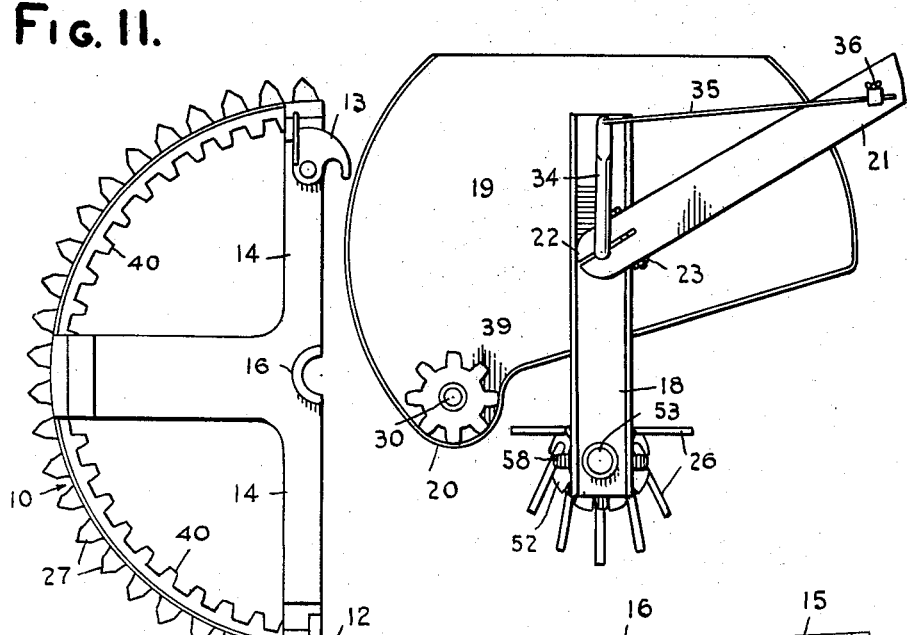
Fig. 11.
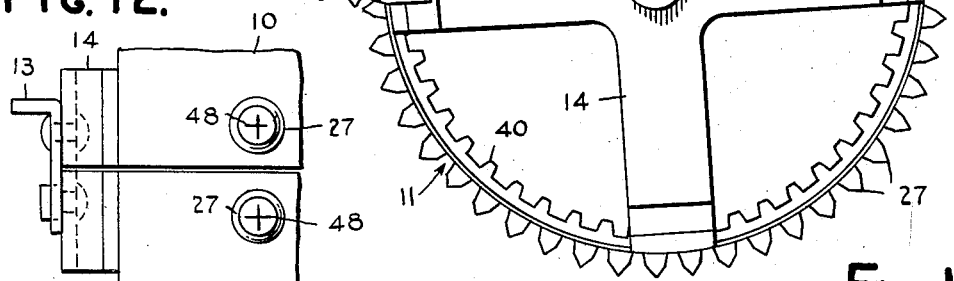
Fig. 12.
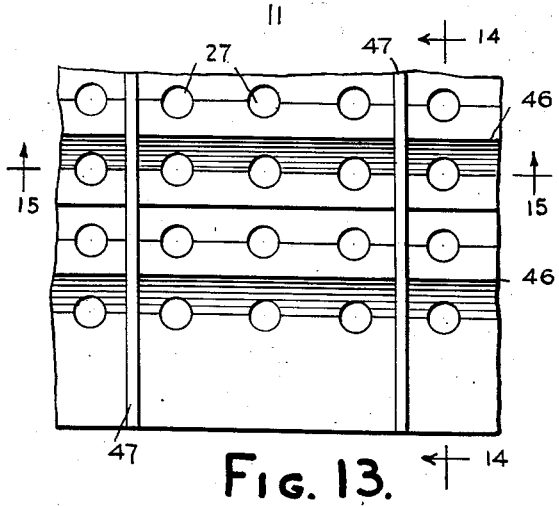
Fig. 13.
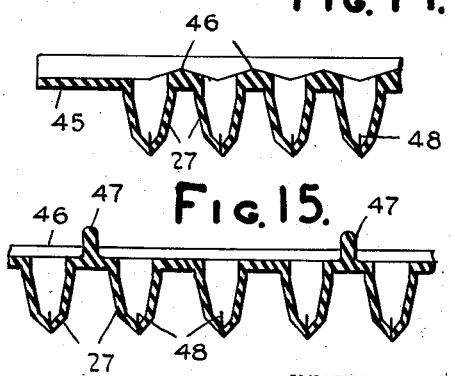
Fig. 14.
Fig. 15.
INVENTORS
PAUL L. CLAUSING
& DON P. CLAUSING
By Holcombe Wetherill & Brisebois
ATTORNEYS

United States Patent Office 2,845,884
Patented Aug. 5, 1958

2,845,884

SUBSURFACE SEED AND FERTILIZER PLANTER

Paul L. Clausing, Ottumwa, Iowa, and Don P. Clausing, Aberdeen, Md.

Application July 14, 1955, Serial No. 521,990

8 Claims. (Cl. 111—91)

This invention relates to hand tools for planting below the surface of the ground small seeds and chemical fertilizer, or organic material in the form of dry powder, or mixtures of seeds and organic material in the form of small pellets, such as heretofore have commonly been distributed by broadcasting methods over the surface of the ground.

Lawn grass seeds and powdery fertilizers deposited on the ground surface blow away in a moderate breeze or are washed away by rain before they can sprout or take effect, and fine seeds which sprout on the surface are easily burned by chemical fertilizers and destroyed by hot sunshine in dry weather unless protected in some way.

Our invention aims to provide improved means for pushing the seeds or fertilizer into the ground in a close pattern such as to approximate broadcasting in distribution but with the protection of a layer of earth of sufficient depth to enable the seeds to germinate and sprout and the fertilizer to be assimilated before being exposed to wind and water and drought such as to prevent it from being fully effective, and to do this without damage to the surface treated.

Further objects of the invention are to simplify the construction and cheapen the cost of manufacture of a hand pushed seed and fertilizer distributor so as to do away with the need for power operation and provide an effective tool suitable for small premises and available to persons of limited means.

Other aims and advantages of the invention appear in connection with the following description of a preferred embodiment of the same illustrated in the accompanying drawings wherein:

Figure 1 is an end elevation of a hand pushed drum type seed and fertilizer planter, with the drum frame partly broken away to disclose the operating mechanism within;

Figure 9 is an enlarged transverse cross-section on the line 9—9 of Fig. 8, and

Figure 10 is a similar cross-section on the line 10—10 of Fig. 8 showing the action of the pushers;

Figure 11 is a dis-assembled view of the two-part drum and the hopper and associated working parts, drawn to a smaller scale than Figs. 1 to 5;

Figure 12 is a detail view of the latch for releasably connecting the two halves of the drum;

Figure 13 is a plan view of a portion of one of the rubber mats for covering the halves of the drum; and Figures 14 and 15 are cross sections thereof on the lines 14—14 and 15—15 of Fig. 13.

The implement resembles a small hand roller for compacting earth being in the form of a cylinder or drum having a stub axle at each end and bifurcated handle for pushing or drawing it over the ground. It is intended to be operated by one man.

Figure 2:
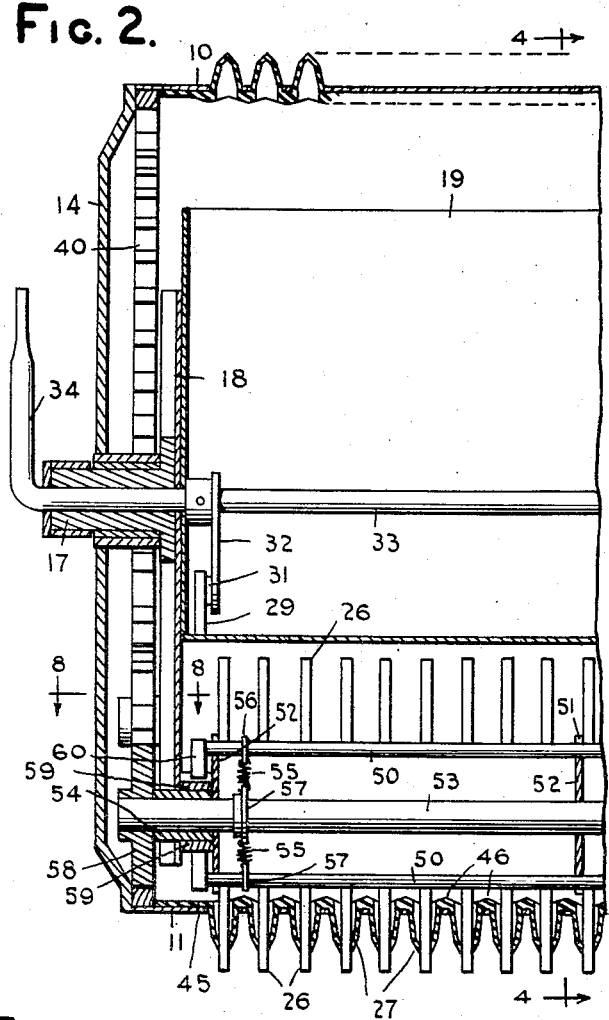
Figure 2 is a vertical cross-section lengthwise thereof on the line 2—2 of Fig. 1, showing a portion of the length of the drum near its left end.
Figure 3:
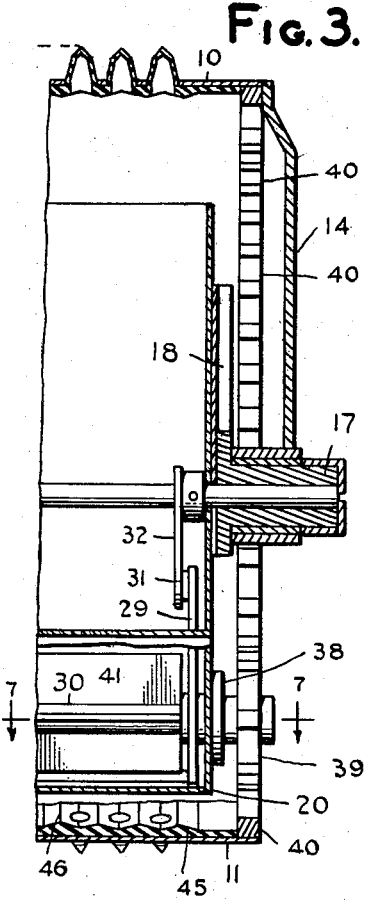
Figure 3 is a similar view of the right end thereof, the lower part of this view being taken on the line 3—3 of Fig. 1.
Figure 8:
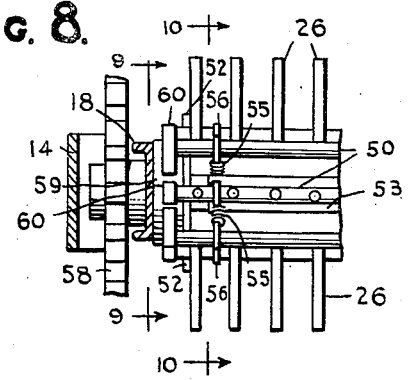
Figure 8 is a part cross-section on the line 8—8 of Fig. 2 and part plan view of a portion of the pusher assembly.
Figure 7:
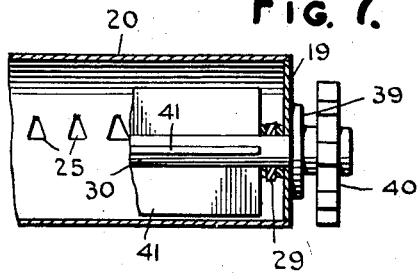
Figure 7 is a fragmentary horizontal cross-section of one end of the feed trough on the line 7—7 of Fig. 3, showing the hopper feed ports.

Referring to Figs. 1, 2, 3 and 11, the cylinder or drum is made of two like parts 10, 11, hinged together along one side of its circumference by alining hinges 12 and secured in closed position by latch members 13. At each side of the drum one of these latch members is pivotally mounted on the end of one of the spokes 14 which lies diametrically opposite the hinge 13 and engaging over the pin 15, as shown in Fig. 12. The spokes converge at the axis of the drum and are formed with semi-cylindrical flanged hub forming projections 16 on their inner sides which in closed position of the drum embrace and rotate on the stub axles 17 forming parts of the inner frame members 18, as shown in Figs. 2 and 3. The frame members 18 are secured to and connected by a hopper 19 having an open top and a part cylindrical feed trough 20 extending lengthwise in its bottom. The handle 21 has two forked ends 22 which are bifurcated and clamped to the outer ends of the stub axles 17 by means of bolts 23.

The feed trough, as shown in Figs. 3 to 7, is provided with openings 25 in its bottom spaced lengthwise thereof in transverse alinement with the respective rings of pushers 26 and nipples 27 which guide and force the seeds into the ground, as hereinafter described. A valve sector 28, mounted on levers 29 pivoted to swing freely on the lengthwise extending shaft 30, may be oscillated to partly or wholly uncover the ports or feed openings 25 in the bottom of the trough to allow the desired amount of seeds, fertilizer or other material to flow from the hopper into the nipples 27 as they pass by beneath. The levers 29, of which there are two, one at each end of the hopper, are held in adjusted position by a pair of links 31 connected to the ends of arms 32 fixed on the ends of the shaft 33 which extends through the hubs 17 and can be adjusted angularly by means of a crank 34 which projects from one end of the seeder frame and is held in adjusted position by means of a rod 35 and clamp nut 36 carried by the handle 21, as shown in Fig. 1.

The shaft 30 is mounted in bearings 38 secured to the ends of the hopper 19 and provided at each end with a pinion 39, the teeth of which engage in a two piece internal gear 40, the halves of which are secured within the drum sections as shown in Fig. 11, so that when the drum is rolled over the ground, the pinions 39 and shaft 30 are caused to rotate in the same direction as the drum. Extending lengthwise on the shaft 30 are stirrer blades 41 which keep moving the material in the hopper and trough across the openings 25 and cause some of it to fall through, the amount depending on the width of opening exposed and the speed of rotation of the shaft, so that the faster the drum is rotated, the more material will be fed and the greater will be the area covered by any setting of the valve 28.

Figure 4:
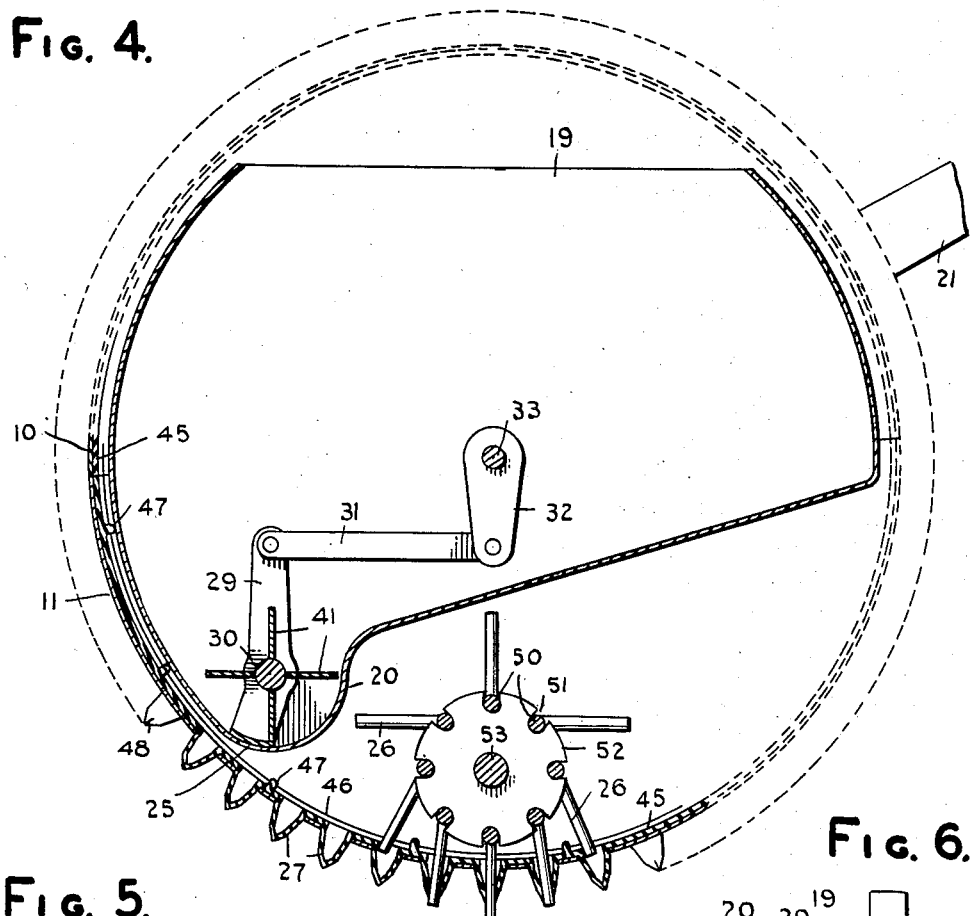
Figure 4 is a transverse vertical cross-section of the drum and operating members therein on the line 4—4 in Fig. 2.
Figure 5:
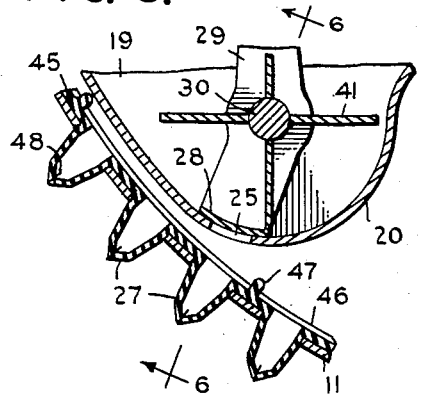
Figure 5 is an enlarged view of a portion of Fig. 4 showing the feed trough.
Figure 6:
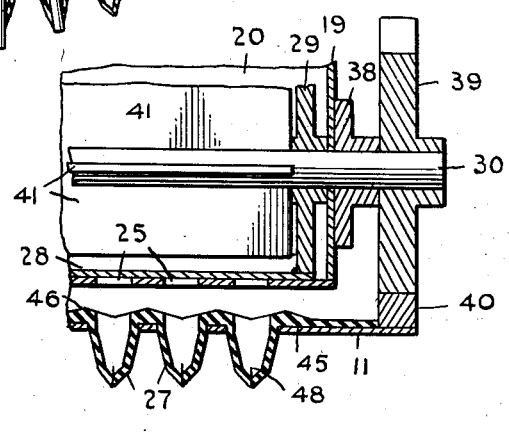
Figure 6 is a cross-section thereof on the line 6—6 of Fig. 5.

The nipples 27 are molded in a rubber mat 45, as shown in Figs. 13, 14 and 15, there being one mat for each half 10, 11 of the drum. The nipples project through holes in the drum and are arranged in rows lengthwise and circumferentially of the drum to aline with the ports 25 and pushers 26, the mat being provided with ridges 46 running circumferentially between the rows of nipples to guide any stray material falling through the ports into the open nipples, and also with ribs 47 running lengthwise of the drum to catch such material as does not fall into the nipples and carry it up the inside of the drum and into the hopper as shown in Fig. 4. The extremities of the nipples are slit after they are molded to permit the pushers 26 to project through them at the bottom of their orbits when they are in contact with the ground, pushing the material in the nipples before them into the ground, as indicated in Figs. 9 and 10. The slits 48 are closed by their resiliency at all times except when the pushers cause them to open, thus preventing loss of seeds or other material.

Preferably pushers 26 are caused to project into and through the nipples and into the ground by mechanism which gives them a substantially vertical movement into and out of the ground, thus avoiding tearing up the ground, and leaving the seeds or other material securely concealed and protected below the surface. This action is due to the manner of supporting and guiding the pushers 26 from bars 50 arranged in U-shaped notches 51 in the peripheries of a series of discs 52 spaced lengthwise of a shaft 53 journaled at its ends in bearings 54 in the frame members 18. These bars 50 are normally retained in the notches 51 by means of springs 55 which are attached at their outer ends to arms 56 on the bars and at their inner ends to collars 57 on the shaft 53, the tension of these springs tending to hold the pushers in radial position with respect to the shaft.

Fastened on each end of the shaft 53 is a pinion 58 which engages in one of the internal gears 40 and causes the shaft to rotate in the same direction as the drum when the tool is pushed over the ground. A pair of cams 59, one of which is secured on the inner side of each frame member 18, and which are respectively engaged by arms 60 on each end of each pusher bar 50, serve to displace the pushers from their radial position at all parts of their orbit as they turn with the shaft 53 except when they are at the bottom and at the top, the shape of the cam being such that they are turned over rapidly in the direction of their movement at the top and slowed down at the bottom so as to stand nearly vertical, being guided at their outer ends by the rubber nipples 27 during the lower portion of their orbital movement.

The apparatus may readily be pushed by one man because the gears 40 and pinions 58 running within them as on a cog railway rotate the pusher assembly, with enough power to force the small pushers vertically into the ground one longitudinal row at a time without the friction that would be developed if cams were used for this purpose, the cams 59 merely causing the pushers to swing over at the top of their orbits in position to enter the alining row of nipples as the pusher assembly rolls over them, which swinging movement requires very little power as the only resistance to be overcome is that of the light springs 55 at the ends of the pusher bars 50 which hold the arms 60 of the latter against the cams.

For charging the hopper with seeds or other material to be planted, the upper half of the drum is unlatched and opened up to expose the hopper, as shown in Fig. 11, which may then be removed with the frame and handle for cleaning or other purpose if desired. This is an advantage as some fertilizers are corrosive. To replace the hopper it is only necessary to make sure that the teeth of the pinions 39 and 58 are in alinement with the teeth of the internal gear 40 at their respective points of engagement, as the cams and springs hold the pushers 26 in proper alinement to engage in the nipples 27.

The only parts requiring lubrication are the bearings 16 for the drums and the bearings 33, 54 for the shafts 30, 53 which carry the feeding mechanism and pusher assembly, all of which are exposed at the ends of the drums and are readily accessible. They may be equipped with oil or grease cups or pressure lubricant fittings if desired.

The pusher bars and pushers are readily replaced if bent or broken as they are secured in the notches 51 only by the springs 55; and broken springs may be replaced without dismantling the rest of the mechanism.

The rubber mats are readily replaceable if the nipples become worn, and the drum may be opened upon completion of a seeding operation and the pusher assembly removed so as not to deform the nipples by the pushers remaining in some of them for extended periods of time.

The invention has many advantages over the power operated seeders and planters heretofore used for large scale operations as it is not only effective for its purpose, but it is comparatively simple in its mechanical construction, inexpensive to manufacture, easy to keep in repair, and capable of being operated by man power without great fatigue.

The invention is not restricted to the details of construction of the illustrative example herein described, but we claim the following:

1. Apparatus for planting seeds and loose materials below ground in a close pattern comprising a drum adapted to be rolled over the ground, said drum being provided with a plurality of regularly spaced circumferential rows of perforations in its outer wall and lined with a flexible rubber-like mat having outwardly projecting nipples with orifices in their outer ends alining with said perforations, axial bearings at the end of said drum, a frame within said drum supported by said bearings, a hopper supported by said frame, spaced outlet means in the bottom of said hopper through which said material is dropped into said perforations, a pusher assembly including an eccentrically positioned shaft rotatably mounted on said frame, means for driving said shaft in timed relation to the movement of the drum over the ground, a plurality of radially positioned groups of pushers connected to and regularly spaced along said shaft, each group of pushers being in alignment with a circumferential row of drum perforations, and pusher advancing means responsive to rotation of said drum for aligning a pusher with and projecting it through each of said perforations when said perforation is at the lowermost point in its rotation, thereby forcing the material which has been dropped into said perforation out through the nipple aligned therewith into the ground.

2. Apparatus as claimed in claim 1 in which said eccentrically positioned shaft carries a cam and a pair of discs provided with radially positioned slots, said pushers are attached to springs biasing one end thereof toward said shaft, and one pusher of each group is connected to a corresponding pusher in every other group by means of an actuating bar, each bar being slidably positioned in one of said disc slots and carrying a fixed arm adapted to engage said cam, the contour of said cam being such that it permits said springs to draw said pushers into a radial position when the bar carrying them is in its uppermost and lowermost positions, but acts on said fixed arms when said bar is in any other position to force said pushers away from a radial position, said shaft and slotted disc being so positioned with respect to said drum as to force the pushers on each bar out through said perforations when said bar is in its lowermost position.

3. Apparatus as claimed in claim 1 in which the inner surface of said flexible mat is provided with circumferential ridges between the circumferential rows of perforations, the sides of said ridges sloping into said nipples so as to direct the material being planted thereinto.

4. Apparatus for planting seeds and loose materials as set forth in claim 1 wherein the pushers are each guided at their free ends by the inner walls of said nipples to move in a substantially vertical direction in entering and leaving the ground.

5. Apparatus for planting seeds and loose materials below ground in a close pattern as set forth in claim 1 wherein the pusher advancing means includes a cam device for orienting the pushers to advance and withdraw vertically in their lower orbital position and to turn over from a receding to an approaching angle in their upper orbital position.

6. Apparatus as claimed in claim 1 in which a central shaft passes through said bearings and carries manually operable means outside of said drum for adjusting its position with respect to said frame, said hopper carries valve means controlling its outlet means, and said valve means and central shaft are connected by linkage so that adjustment of the position of said central shaft brings about a corresponding adjustment of the position of said valve means.

7. Apparatus as claimed in claim 2 in which said means for driving said eccentrically positioned shaft comprises an internal gear on said drum which drives a meshing gear fixed to said shaft.

8. Apparatus as claimed in claim 7 in which said internal gear drives a material agitator mounted in said hopper.

References Cited in the file of this patent

UNITED STATES PATENTS

| | | |
|---|---|---|
| 491,994 | Erickson | Feb. 21, 1893 |
| 2,193,779 | Ramsden et al. | Mar. 12, 1940 |

FOREIGN PATENTS

| | | |
|---|---|---|
| 501,337 | Belgium | Mar. 15, 1951 |